United States Patent
Murakami (10) Patent No.: US 10,404,920 B2
(45) Date of Patent: Sep. 3, 2019

(54) IMAGE STABILIZATION APPARATUS, LENS BARREL, AND IMAGING APPARATUS

(71) Applicant: CANON KABUSHIKI KAISHA, Tokyo (JP)

(72) Inventor: Taro Murakami, Musashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/690,571

(22) Filed: Aug. 30, 2017

(65) Prior Publication Data

US 2018/0070016 A1  Mar. 8, 2018

(30) Foreign Application Priority Data

Sep. 6, 2016 (JP) ................................. 2016-173246

(51) Int. Cl.
| | |
|---|---|
| H04N 5/232 | (2006.01) |
| G02B 27/64 | (2006.01) |
| G03B 5/06 | (2006.01) |
| H04N 5/225 | (2006.01) |

(52) U.S. Cl.
CPC ....... *H04N 5/23287* (2013.01); *G02B 27/646* (2013.01); *G03B 5/06* (2013.01); *H04N 5/2254* (2013.01); *G03B 2205/0007* (2013.01); *G03B 2205/0023* (2013.01)

(58) Field of Classification Search
CPC ............. H04N 5/23287; H04N 5/2254; G02B 27/646; G03B 5/06
See application file for complete search history.

(56) References Cited

U.S. PATENT DOCUMENTS

| | | | |
|---|---|---|---|
| 7,742,096 B2 | 6/2010 | Murakami | |
| 8,787,746 B2 | 7/2014 | Yasuda | |
| 2008/0240704 A1* | 10/2008 | Takahashi | G03B 17/00 396/419 |
| 2009/0015709 A1* | 1/2009 | Kimura | G03B 17/00 348/374 |
| 2009/0251777 A1* | 10/2009 | Suzuki | G02B 27/646 359/554 |
| 2012/0218428 A1* | 8/2012 | Suzuka | G02B 27/646 348/208.7 |
| 2014/0119717 A1* | 5/2014 | Yasuda | G02B 27/646 396/55 |
| 2015/0010296 A1* | 1/2015 | Yasuda | G02B 27/646 396/55 |

(Continued)

FOREIGN PATENT DOCUMENTS

| | | |
|---|---|---|
| JP | H02-238429 A | 9/1990 |
| JP | 2012-237856 A | 12/2012 |
| JP | 2014-089325 A | 5/2014 |

*Primary Examiner* — Abdelaaziz Tissire
(74) *Attorney, Agent, or Firm* — Venable LLP (57) ABSTRACT

An image stabilization apparatus includes a correction lens, a movable member configured to hold the correction lens and to move on a spherical surface with a predetermined point as a center on an optical axis for an image stabilization, and a base member configured to movably hold the movable member and including a second surface that contacts a first surface on the movable member when the movable member moves. At least one of the first surface on the movable member and the second surface on the base member inclines to the predetermined point so as to approach to the optical axis.

12 Claims, 10 Drawing Sheets

(56) References Cited

U.S. PATENT DOCUMENTS

| | | | |
|---|---|---|---|
| 2015/0195460 A1* | 7/2015 | Yasuda | G02B 27/646 348/208.11 |
| 2015/0237259 A1* | 8/2015 | Yasuda | G02B 27/646 348/208.11 |
| 2017/0003516 A1* | 1/2017 | Kiyamura | G02B 27/646 |
| 2018/0067336 A1* | 3/2018 | Izumi | G02B 27/646 |

* cited by examiner

IMAGE STABILIZATION APPARATUS, LENS BARREL, AND IMAGING APPARATUS

BACKGROUND OF THE INVENTION

Field of the Invention

The present invention relates to a lens barrel having an image stabilization function.

Description of the Related Art

A conventional image stabilization method realizes an image stabilization function or corrects an image blur so as to prevent an image from degrading due to a hand shake, etc. by shifting a correction lens. Japanese Patent Laid-Open No. ("JP") 2012-237856 discloses an imaging apparatus that includes mechanical end stoppers on a shift unit and an adjacent unit to the shift unit, restricts a movable range of the shift unit by bringing the mechanical stoppers into contact with each other, and calculates a center position (corresponding to the optical axis) of the shift unit based on the positions of the mechanical end stoppers. JP 2-238429 discloses an image stabilizing optical system that provides an image stabilization by rotating a second unit. JP 2014-89325 discloses an apparatus that corrects an image blur by moving an optically correcting member along a spherical surface around the rotational center point as a center.

JP 2012-237856 discloses calculating an optical axis center of a shift unit (shift correction lens), but it is difficult to provide an optical adjustment using another unit relatively moving in an optical axis direction as in JP 2012-237856 in the configuration having the tilt correction lens as in JPs 2-238429 and 2014-89325.

In addition, where a tilt unit configured to tilt and move on a spherical surface around one point on the optical axis as a center is tilted for an image stabilization, the tilt unit goes up and down and tilts when the tilt unit collides with a cylindrical mechanical end. Thus, a measured value scatters in adjusting the center position (corresponding to the optical axis) as the center part by colliding the tilt unit with the mechanical end as in JP 2012-237856. In other words, in the image stabilization through tilting, the tilt unit moves on the spherical surface and an angle by which the stoppers collide with each other varies according to an angle of the tilt unit. Thus, the configuration similar to the shift unit causes a point or line collision between the stoppers and the collision angle is unstable. As a result, it is difficult to stably and accurately adjust the center position of the tilt correction lens.

SUMMARY OF THE INVENTION

The present invention provides an image stabilization apparatus, a lens barrel, and an imaging apparatus, which can stably and accurately adjust a center position of a tilt correction lens.

An image stabilization apparatus according to one aspect of the present invention includes a correction lens, a movable member configured to hold the correction lens and to move on a spherical surface with a predetermined point as a center on an optical axis for an image stabilization, and a base member configured to movably hold the movable member and including a second surface that contacts a first surface on the movable member when the movable member moves. At least one of the first surface on the movable member and the second surface on the base member inclines to the predetermined point so as to approach to the optical axis.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

First Embodiment

Figure 1:
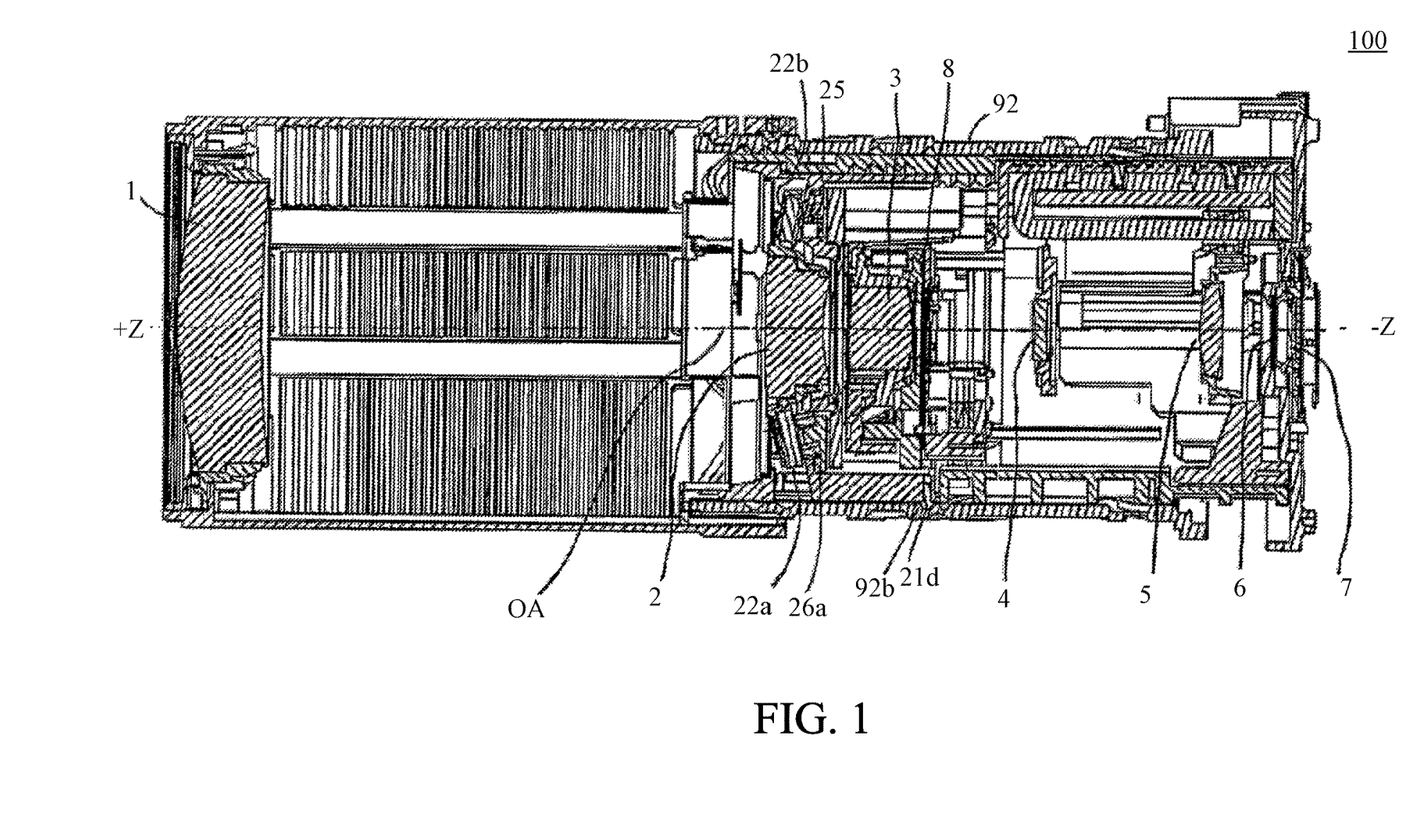
FIG. 1 is a sectional view of a lens barrel in an imaging state or image capturing state according to a first embodiment.
Figure 2:
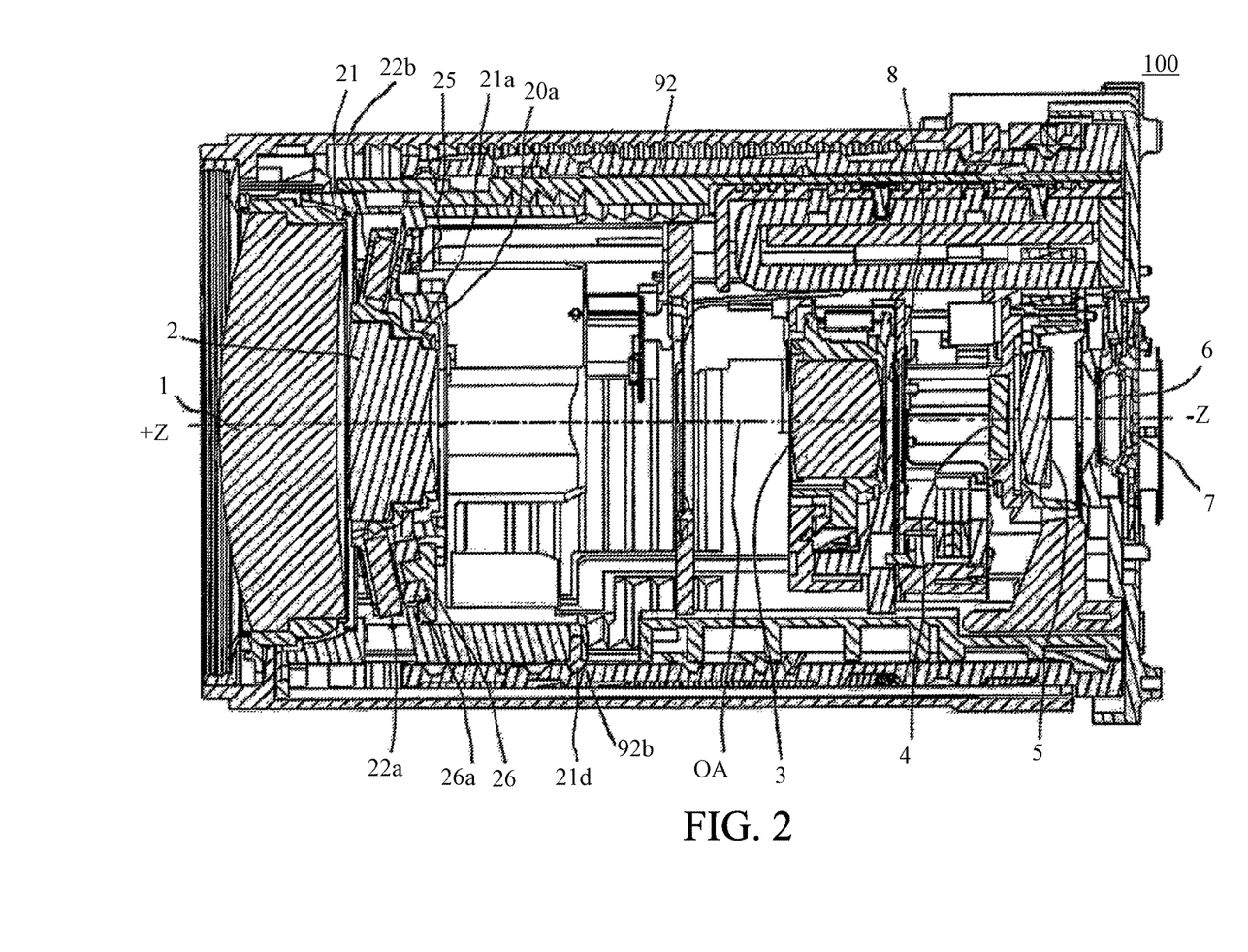
FIG. 2 is a sectional view of the lens barrel in a retracted state according to the first embodiment.

Referring now to FIGS. 1 and 2, a description will be given of a lens barrel according to a first embodiment of the present invention. FIGS. 1 and 2 are sectional views of the lens barrel 100. FIG. 1 illustrates an (imaging or image capturing) state where the lens barrel 100 is located at an imaging available position (telephoto position), and FIG. 2 illustrates a (retracted) state where the lens barrel 100 is located at a housed or retracted position. This retractable type lens apparatus 100 is used for an imaging apparatus, such as a digital camera. A description will now be given of a positional relationship among respective components where an object side of an optical axis OA in an optical system is defined as a front side (projecting direction +Z), an image plane side of the optical axis OA is defined as a rear side (retracting direction −Z), and a side closer to the optical axis OA is defined as an inner side.

The (imaging) optical system in the lens barrel 100 includes, in order from the object side to the image plane side, a first lens unit 1, a second lens unit 2, a third lens unit 3, a stop (or diaphragm) shutter unit 8, a fourth lens unit 4, a fifth lens unit 5, an optical filter 6, and an image sensor 7. The second lens unit 2 is a correction lens (tilt correction lens) in an image stabilization mechanism (image stabilization apparatus) according to this embodiment. Each lens unit includes one or more lenses. The first lens unit 1 to the fifth lens unit 5 are moved in the optical axis direction along the optical axis OA between the imaging available position and the housed position so as to change an imaging magnification by a rotatable cam cylinder 92 (moving cam cylinder) as a known cam mechanism, a known reduction mechanism, and a driving motor. The fifth lens unit 5 is moved along the optical axis direction by the known motor driving so as to change a focus position at which the object is imaged, and the known focus detector provides focusing so as to focus the object image on the imaging plane of the image sensor 7. The image sensor 7 includes a CMOS image sensor etc., photoelectrically converts an object image (optical image) formed by the imaging optical system, and outputs an image signal (image data).

Figure 3:
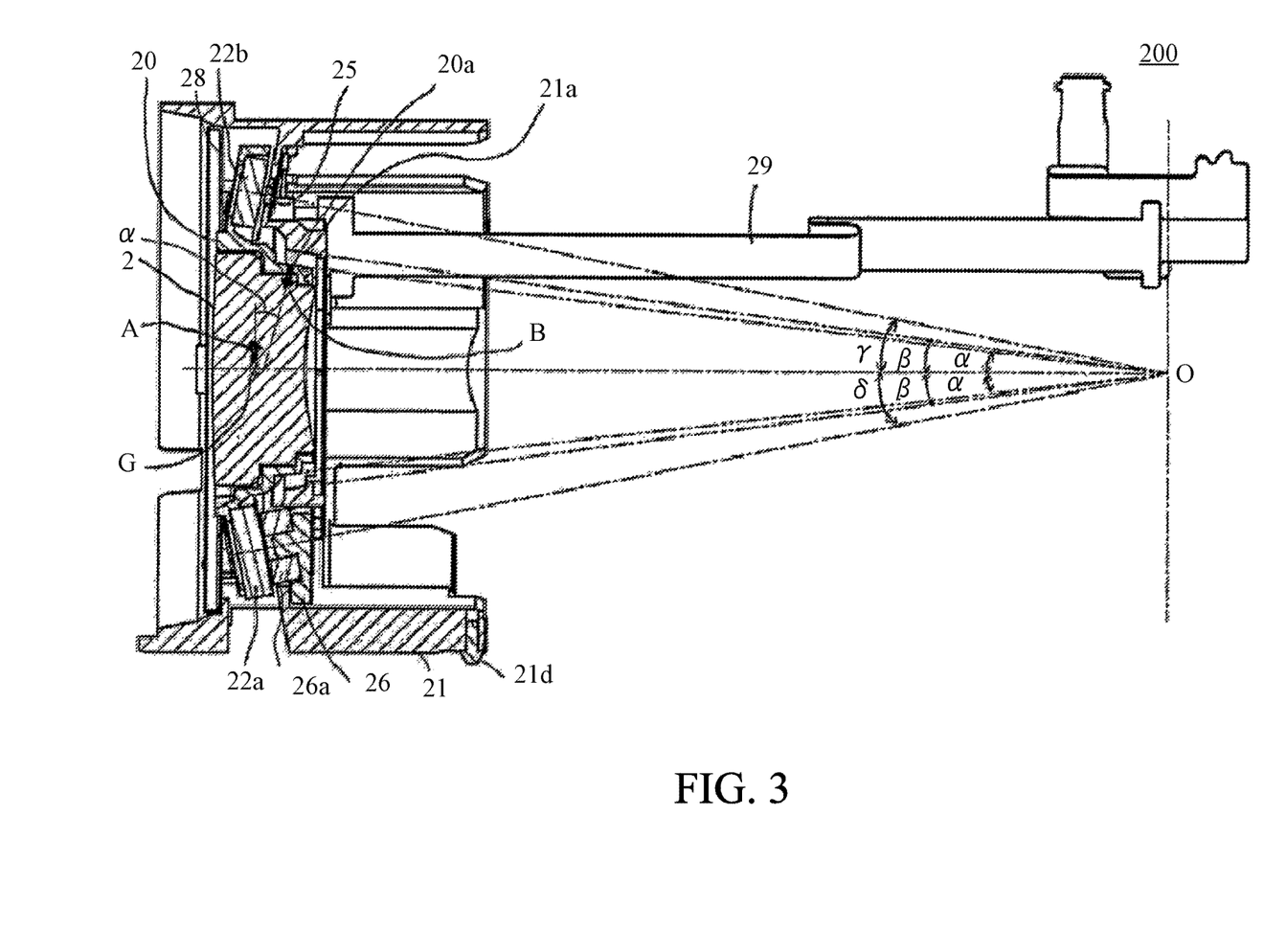
FIG. 3 is a sectional view of an image stabilization mechanism in a state where a tilt correction lens is not tilted relative to the optical axis in the lens barrel according to the first embodiment.

Referring now to FIG. 3, a description will be given of the image stabilization mechanism according to this embodiment. FIG. 3 illustrates a sectional view of an image stabilization mechanism 200 (tilt image stabilization mechanism) in a state where the second lens unit 2 (tilt correction lens) is not moved or is not tilted relative to the optical axis OA. FIG. 3 corresponds to the sectional view taken along a line III-III in FIG. 4.

The second lens unit 2 serves as the tilt correction lens, and corrects the position of the image formed on a light receiving surface on the image sensor (for an image stabilization) as the tilt correction lens moves on a spherical locus with one point O on the optical axis OA as a center. In other words, a variation amount of the image position caused by a hand shake etc. of a photographer who holds the imaging apparatus (camera) is cancelled out as the second lens unit 2 moves on the spherical locus for the image stabilization. The image stabilization apparatus that includes the second lens unit 2 is controlled by an unillustrated drive controller. A second unit cylinder (base member) supports the entire second unit that includes the second lens unit 2. A cam pin 21*d* is integrally press-fit in the second unit cylinder 21, and the second unit cylinder 21 moves in the optical axis direction as a result of that the cam pin 21*d* is engaged with a cam groove 92*b* in a cam cylinder 92.

Figure 4:
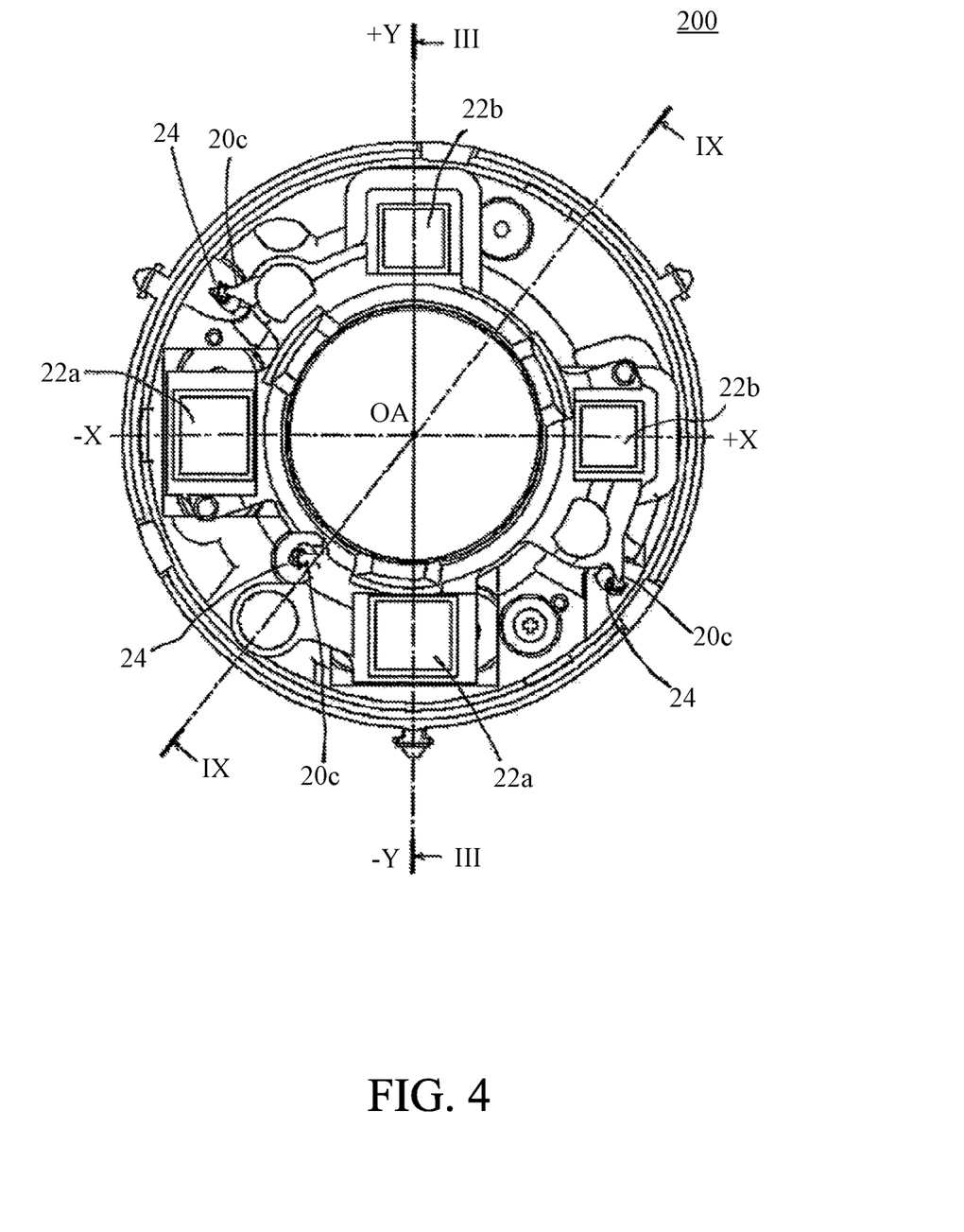
FIG. 4 is a front view of the image stabilization mechanism according to the first embodiment.
Figure 5:
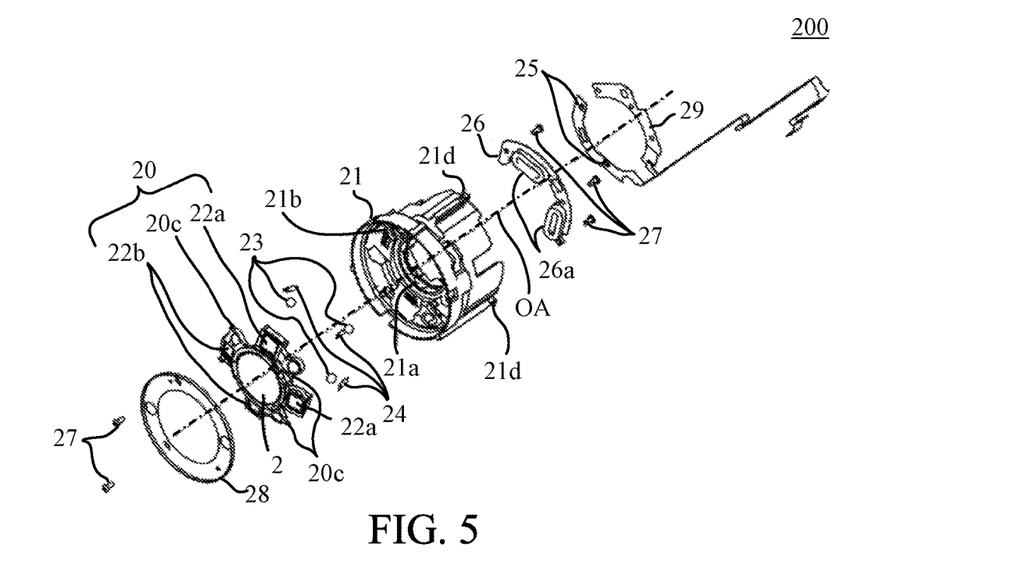
FIG. 5 is an exploded perspective view of the image stabilization mechanism viewed from the object side according to the first embodiment.
Figure 6:
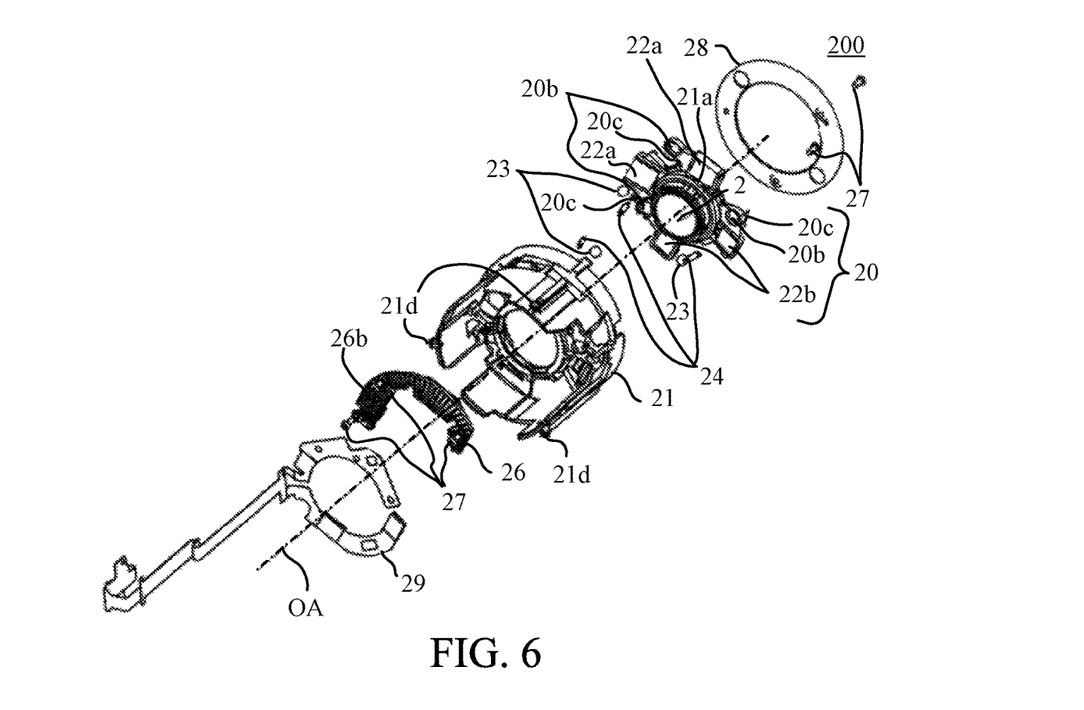
FIG. 6 is an exploded perspective view of the image stabilization mechanism viewed from the image plane side according to the first embodiment.

Referring now to FIGS. 4 and 6, a description will be given of a structure of an image stabilization mechanism 200 (structure for tilting the second lens unit 2). FIG. 4 is a front view of the image stabilization mechanism 200 viewed from the object side in the optical axis direction. FIGS. 5 and 6 are exploded perspective views of the image stabilization mechanism 200. FIG. 5 is a view viewed from the object side, and FIG. 6 is a view viewed from the image side. FIG. 4 omits component unnecessary for the description.

The second lens unit 2 is held by a lens holder 20 (movable member). In the lens holder 20, two types of magnets (a drive magnet 22*a* and a sensor magnet 22*b*, which will be explained later) are integrally held two by two by the insert molding. The lens holder 20 holds the second lens unit 2 (correction lens) and is configured to move on the spherical surface with the predetermined point (rotational center O) as a center on the optical axis OA for an image stabilization. The lens holder 20 includes a first surface (stopper surface 20*a*) that contacts a second surface (stopper surface 21*a*) in the second unit cylinder 21 (base member) when the lens holder 20 moves. The first surface in the lens holder 20 serves as a stopper for stopping the lens holder 20.

A front mask 28 is a nonmagnetic metallic cover screwed onto the second unit cylinder 21 by screws 27, and covers an unexposed part of the second lens unit 2 on the object side of the lens holder 20 so as to shield the light and maintain the fine view. In FIG. 4, the front mask 28 is omitted.

Reference numeral 22*a* denotes two drive magnets, and reference numeral 22*b* denotes two sensor magnets. The drive magnets 22*a* constitute an actuator configured to drive the lens holder 20 in the tilt direction. As illustrated in FIG. 4, the two drive magnets 22*a* are arranged in the −X direction and in the −Y direction so as to form an angle of 90° around the optical axis OA as a center. The two sensor magnets 22*b* are arranged in the +X direction and in the +Y direction so as to form an angle of 90° around the optical axis OA as a center. As illustrated in FIG. 3, the sensor magnet 22*b* is disposed so as to form an angle γ between the optical axis OA and a line that connects the center of the sensor magnet 22*b* and the rotational center O. The drive magnets 22*a* and the sensor magnets 22*b* are magnetized so that the image plane side in the direction of the rotational center O and close to the optical axis OA is set to the N pole, the image plane side and the side apart from the optical axis OA is set to the S pole, the object side close to the optical axis OA is set to the S pole, and the object side apart from the optical axis OA is set to the N pole.

The lens holder 20 is provided on the second unit cylinder 21 via three rolling spheres 23. The lens holder 20 is integrated with three tabs 20*c*, and the second unit cylinder 21 is integrated with three tabs 21*c* (see FIG. 9). There are three tension springs 24 between the three tabs 20*c* and the three tabs 21*c*. Since the lens holder 20 and the second unit cylinder draw each other due to the action of the tension spring 24, the rolling spheres 23 are held.

Figure 9:
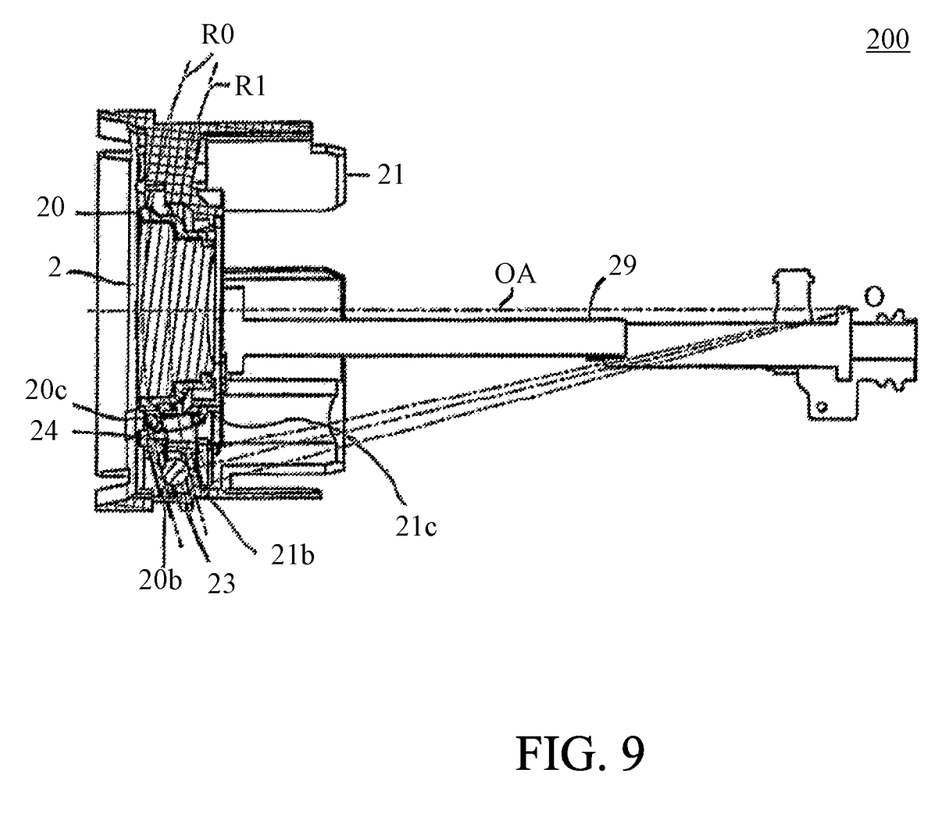
FIG. 9 is a sectional view of the image stabilization mechanism in a state where the tilt correction lens is not tilted relative to the optical axis in the lens barrel according to the first embodiment.

FIG. 9 is a sectional view of the image stabilization mechanism 200 (tilt image stabilization mechanism) in a state where the second lens unit 2 (tilt correction lens) is not moved or is not tilted relative to the optical axis OA. FIG. 9 corresponds to the sectional view taken along a line IX-IX in FIG. 4. As illustrated in FIG. 9, the lens holder 20 includes a spherical receiving surface 20*b* that has a spherical R surface with a radius R0 and the second unit cylinder 21 includes a spherical receiving surface 21*b* that has a spherical R surface with a radius R1, as receiving surface parts that contact the rolling spheres 23. The spherical receiving surfaces 20*b* and 21*b* constitute part of the spherical surface with the rotational center O as the center on the optical axis OA. Since the rotational center O is closer to the image plane than the second lens unit 2 in this embodiment, the spherical receiving surface 20*b* on the object side has a concave spherical surface and the spherical receiving surface 21*b* on the image plane side has a convex spherical surface.

A coil bobbin unit 26 has two coil windings 26*a* at positions corresponding to the two drive magnets 22*a*. Where the second lens unit 2 in the lens holder is aligned with the optical axis direction, as illustrated in FIG. 3, the coil windings 26*a* are disposed approximately parallel to the drive magnets 22*a*. In addition, as illustrated in FIG. 3, the coil windings 26*a* are disposed so as to form an angle δ between the optical axis OA and a line that connects a center of a core in the coil winding 26*a* and the rotational center O.

In other words, the core center in the coil winding 26a and the center of the drive magnet 22a are arranged on the same line. A radiation fin unit 26b is integrally formed on an object side of the metallic coil bobbin unit 26 (bobbin chassis). The radiation fin unit 26b radiates the heat generated from the coil windings 26a. The coil bobbin unit 26 is fixed by the screws 27.

Reference numeral 29 denotes a flexible printed circuit substrate (FPC) mounted with two Hall elements 25. The unillustrated drive controller (drive control circuit) is connected to the coil windings 26a via the FPC 29 by electrically connecting both ends of the coil windings 26a to the FPC 29. The FPC 29 is adhered onto the second unit cylinder 21 on the image plane side.

The two Hall elements 25 are arranged at positions corresponding to the two sensor magnets 22b. As illustrated in FIG. 3, similar to the drive magnets 22a, where the center of the second lens unit 2 is located on the optical axis OA, the center of the sensor magnet 22b coincides with the center of the Hall element 25. In other words, the optical axis OA and a line that connects the optical axis OA to the center of the Hall element 25 and the center of the sensor magnet 22b form an angle γ. As the position of the sensor magnet 22b varies, the output signal from the Hall element 25 changes due to the change of the magnetic field in the position of the Hall element 25. Hence, the position of the second lens unit 2 (inclined position) can be detected based on (a variation of) the output signal from the Hall element 25.

An outer circumferential surface on part of the lens holder 20 for holding the second lens unit 2 has stopper surfaces 20a (first surface) in four directions with axes in directions in which the drive magnets 22a and the sensor magnets 22b are arranged as part of the tilting actuator. Four stopper surfaces 20a are configured so that all their extended surfaces intersect with one another at the rotational center O. In other words, the four stopper surfaces 20a form part of the conic surface with the rotational center O as a vertex. The stopper surface 20a (line that connects the stopper surface 20a and the rotational center O) and the optical axis OA form the angle α.

An inner circumferential surface on the second unit cylinder 21 has stopper surfaces 21a (second surface) in four directions with axes in direction in which the coil windings 26a are arranged as part of the tilting actuator. The four stopper surfaces 21a are formed so that all their extended surfaces intersect with one another at the rotational center O. In other words, the four stopper surfaces 21a form part of the square pyramid surface with the rotational center O as the vertex. In addition, the stopper surfaces 21a (line that connects the stopper surface 21a and the rotational center O) and the optical axis OA form the angle 3. Thus, the second unit cylinder 21 movably holds the lens holder 20, and includes the stopper surfaces 21a (second surface) that contact the stopper surfaces 20a (first surface) on the lens holder 20 when the lens holder 20 moves.

Figure 7:
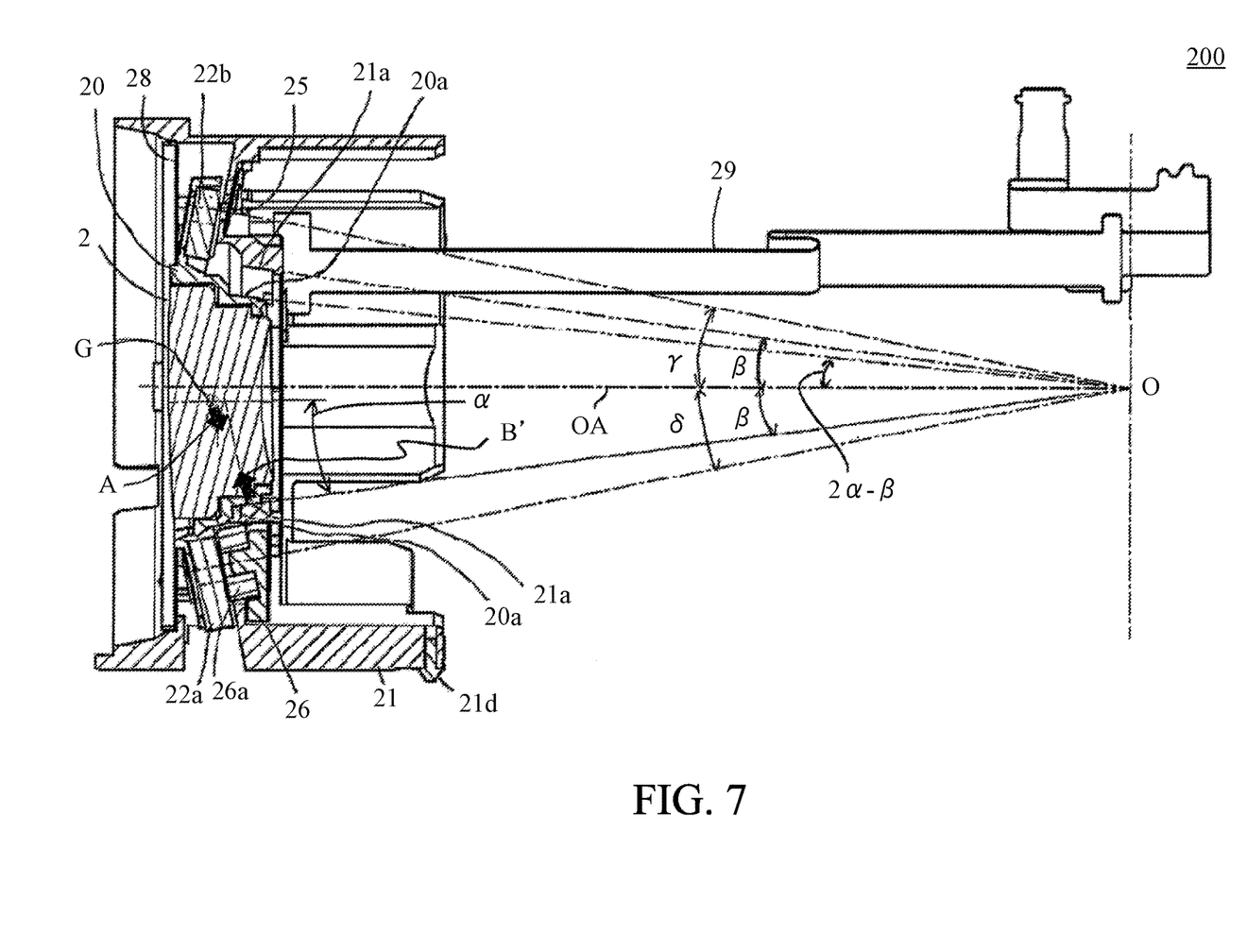
FIG. 7 is a sectional view of the image stabilization mechanism in a state where the tilt correction lens inclines with a maximum angle relative to the optical axis of the lens barrel in a paper down direction according to the first embodiment.
Figure 8:
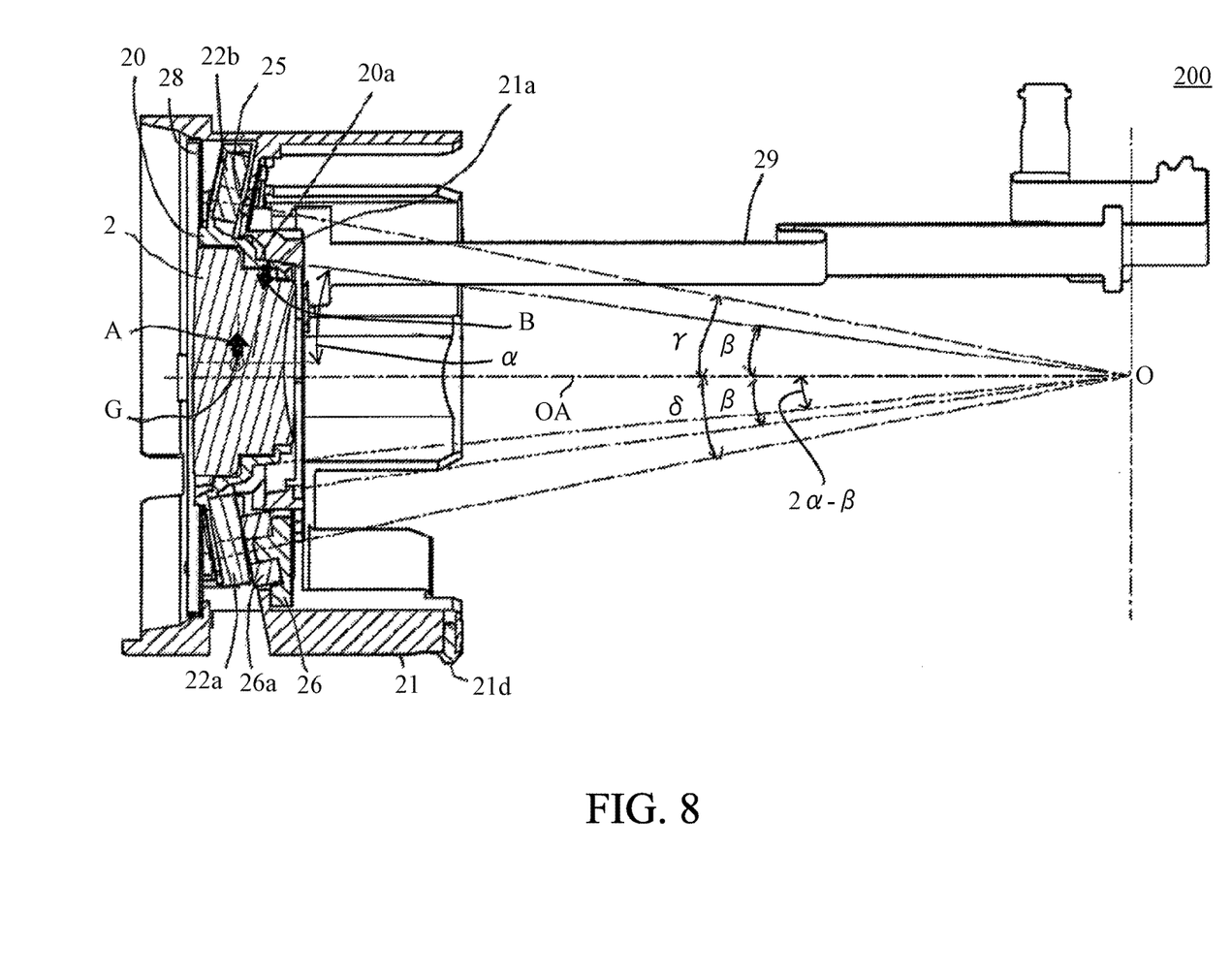
FIG. 8 is a sectional view of the image stabilization mechanism in a state where the tilt correction lens inclines with a maximum angle relative to the optical axis of the lens barrel in a paper up direction according to the first embodiment.

Referring now to FIGS. 7 and 8, a description will be given of driving for the tilt image stabilization. FIGS. 7 and 8 are sectional views of the image stabilization mechanism 200, illustrating that the second lens unit 2 tilts and contacts the stoppers. In other words, FIG. 7 illustrates that the second unit 2 is located at the mechanical end and forms the maximum angle in the paper down direction relative to the optical axis OA of the entire lens systems (or contacts the stoppers with the maximum tilt angle). FIG. 8 illustrates that the second unit 2 is located at the mechanical end and forms the maximum angle in the paper up direction relative to the optical axis OA of the entire lens systems (or contacts the stoppers with the maximum tilt angle).

The tilt angle in FIG. 7 is β-α in the −Y direction as the paper down direction. The tilt angle in FIG. 8 is β-α in the +Y direction as the paper up direction. In either FIG. 7 or FIG. 8, the tilt angle in the paper depth direction is 0°. In contact with the stoppers, the stopper surfaces 20a and 21a contact each other in parallel.

When the coil windings 26a are electrified via the FPC 29, a force is generated so as to bring the drive magnets 22a into approximately contact with a circumference with the rotational center O as a center due to the action of the electromagnetic force. Since the centripetal force is generated by a combination of forces of the three tension springs 24, the resultant force causes to the second lens unit 2 to start rotating and to continue rotating until the second lens unit 2 contacts the stoppers. The second lens unit 2 can be tilted with an arbitrary angle between −(β-α) and +(β-α) by feedback-controlling an electrifying amount in the coil windings 26a in accordance with variations of the output singles from the Hall elements 25. Since this embodiment provides the actuators, the detectors, and the stoppers in directions orthogonal to each other, the two-dimensional tilting is available on the spherical R surface with the rotational center O as a center.

FIGS. 3, 7, and 8 illustrate a centroid G (center of gravity) of entire movable parts in the second unit, such as the tilting second lens unit 2, the lens holder 20, and the magnets. A vector A indicates a moving direction of the centroid G, and a vector B corresponds to a vector of a reaction force which the stopper surfaces 20a receive in the lens holder 20 in the collision. In FIG. 3, the vector B forms the angle α relative to the vector A. For simple description, assume that a mass difference between the drive magnet 22a and the sensor magnet 22b is sufficiently smaller than the mass of the second lens unit 2. Then, the centroid G is located on the axis in the second lens unit 2. In any directions, the reaction forces of the impacts received by the stoppers 20a are symmetric, and the vector B and the vector B' are symmetrical with respect to the optical axis OA. Since an extension of the vector B passes a vicinity of the centroid G or may pass the centroid G, there is few moments around the centroid G in the entire movable parts in the second unit (including the second lens unit 2 and the lens holder 20).

Next follows a description of an adjustment centering method according to this embodiment. In order to determine whether the second lens unit 2 is located at the optical center position and is aligned with the optical axis direction, the output signals from the Hall elements 25 are measured while the second lens unit 2 contacts the stoppers (stopper surfaces 20a and 201b) at both upper and lower ends and a median is calculated in the output signal, as illustrated in FIGS. 7 and 8. A feedback control for fixing the drive magnet 22a in the lens holder 20 onto the median can provide an adjustment such that the optical axis OA in the entire lens barrel 100 coincides with the optical axis in the second lens unit 2 held in the lens holder 20.

In this embodiment, the stopper surfaces 20a in the lens holder 20 may be provided at positions corresponding to the lens part having the smallest diameter in the second lens unit 2 (which is a lens having a minimum diameter where the second lens unit 2 includes a plurality of lenses) in the optical axis direction. The stopper surfaces 20a in the lens holder may be closer to the optical axis OA than the actuator (drive magnets 22a) configured to move the lens holder 20. A normal line on the stopper surface 20a in the lens holder 20 may pass the center G of the whole member that includes the second lens unit 2 and the lens holder 20.

Second Embodiment

Figure 10:
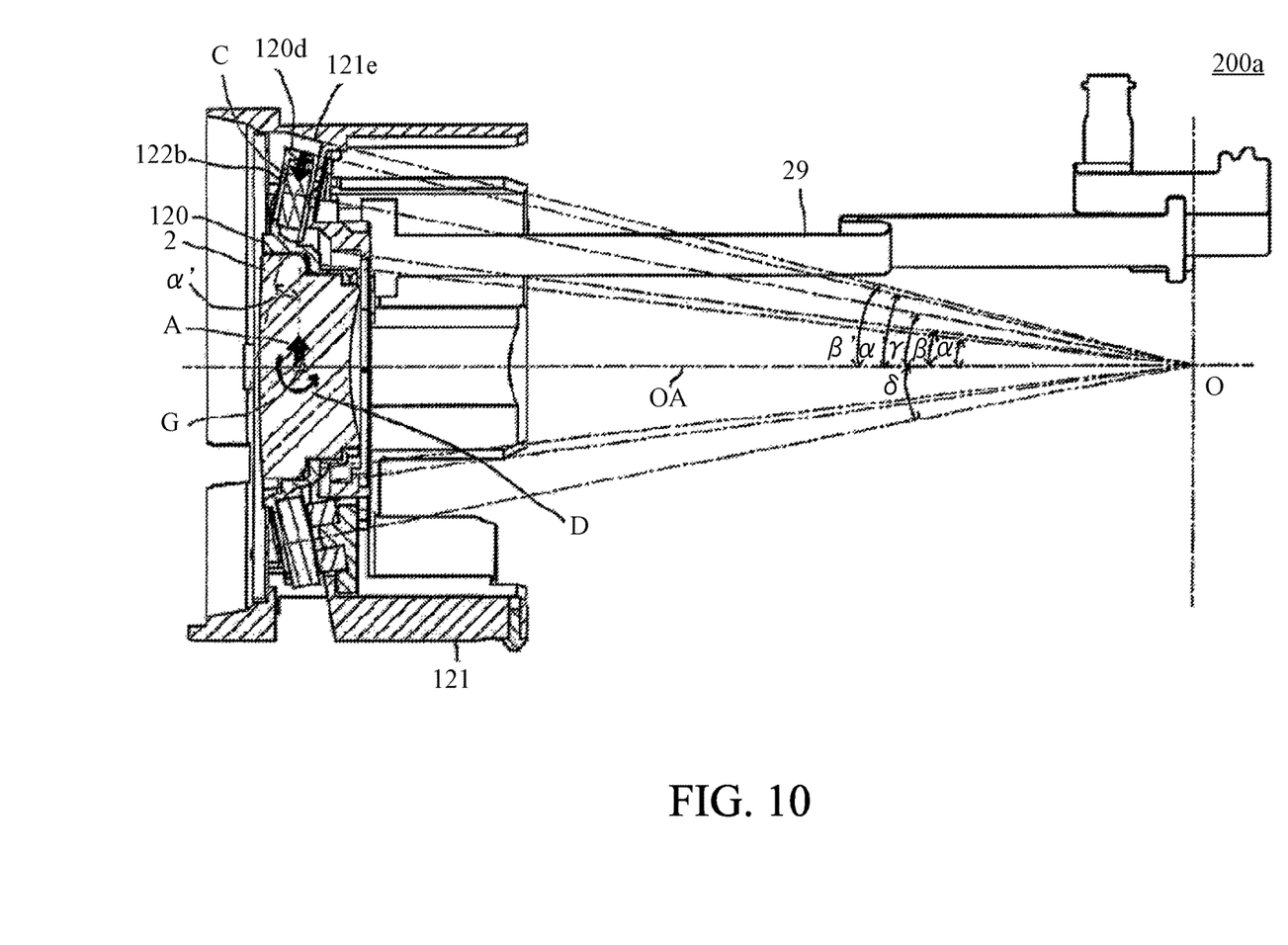
FIG. 10 is a sectional view of an image stabilization mechanism in a state where the tilt correction lens is not tilted relative to the optical axis in the lens barrel according to a second embodiment.

Referring now to FIG. 10, a description will be given of an image stabilization mechanism according to a second embodiment of the present invention. FIG. is a sectional view of an image stabilization mechanism 200a (tilt image stabilization mechanism) in a state where the second lens unit 2 (tilt correction lens) is not moved or is not tilted relative to the optical axis OA.

In the image stabilization mechanism 200a, the mechanical stoppers are provided outside the magnets. The first embodiment provides the mechanical stoppers to the stopper surfaces 20a around the second lens unit 2. On the other hand, this embodiment provides a stopper surface 120d in a lens holder 120 and a stopper surface 121e in a second unit cylinder 121 outside sensor magnets 122b and outside the position around the lens in the second lens unit 2 from the optical axis OA. Other structures are similar to those in the first embodiment, and a description thereof will be omitted.

For comparison purposes, FIG. 10 illustrates lines of the stopper angles α and β in the first embodiment inside the magnets. In this embodiment, an angle α' of the stopper surface 120d and an angle β' of the stopper surface 120e relative to the optical axis OA on the conic surface with the rotational center O as a vertex are larger than the angles α and β. Since the maximum tilt angles are set to the same angles as those in the first embodiment, a relationship of the maximum tilt angles β'-α'=β-α is established. In the contact, the stopper surfaces 120d and 121e contact each other in parallel.

In this embodiment, the vector A represents a rotating direction at the position of the centroid G of the entire tilt unit that includes a colliding stopper surfaces 120d, the second lens unit 2, the lens holder 120, and all magnets. Then, due to the positional relationship and the angles of the stoppers, the repulsion force which the stopper surface 120d receives from the stopper surface 121e is represented by the vector C illustrated in FIG. 10 in the direction perpendicular to the stopper surface 121e. Since the angle α' of the repulsion force C relative to the vector A is large and its surface is distant from the optical axis OA, the extension of the vector of the repulsion force C is distant from the centroid G and the rotating moment occurs in the D direction in FIG. 10 in the collision.

When this embodiment is compared with the first embodiment, the repulsion force (vector B) which the tilt unit generates in the collision with the stoppers in the first embodiment is closer to the centroid G, and thus few moments occur around the centroid G. On the other hand, according to this embodiment, the repulsion force (vector C) faces a direction distant from the centroid G and thus a comparatively large moment occurs in the arrow D direction. Hence, the tilt unit rotates and is likely to goes up in the collision. Due to the repulsion force (vector B) which the stopper surface in the lens holder 20 receives from the stopper surface in the second unit cylinder 2, the configuration of the first embodiment is suitable because the first embodiment sets the stopper surfaces to the inside as close to the optical axis OA as possible.

Setting the stoppers in a range smaller than the outer diameter of the second lens unit 2 is unavailable because this configuration causes light shielding. Moreover, part having a short diameter closest to the image plane is improper since it is used for adhesion with the lens or heat caulking. The centroid position is close to the position of the stopper surface 120a, and a moment caused by a reaction force in the collision can be made smaller. Hence, the positions of the stoppers 20a in the first embodiment illustrated in FIG. 3, etc. are stable and suitable for acquiring data in the collision. Nevertheless, the structure in this embodiment makes the center position in the tilt correction lens stably and accurately adjustable.

Figure 11:
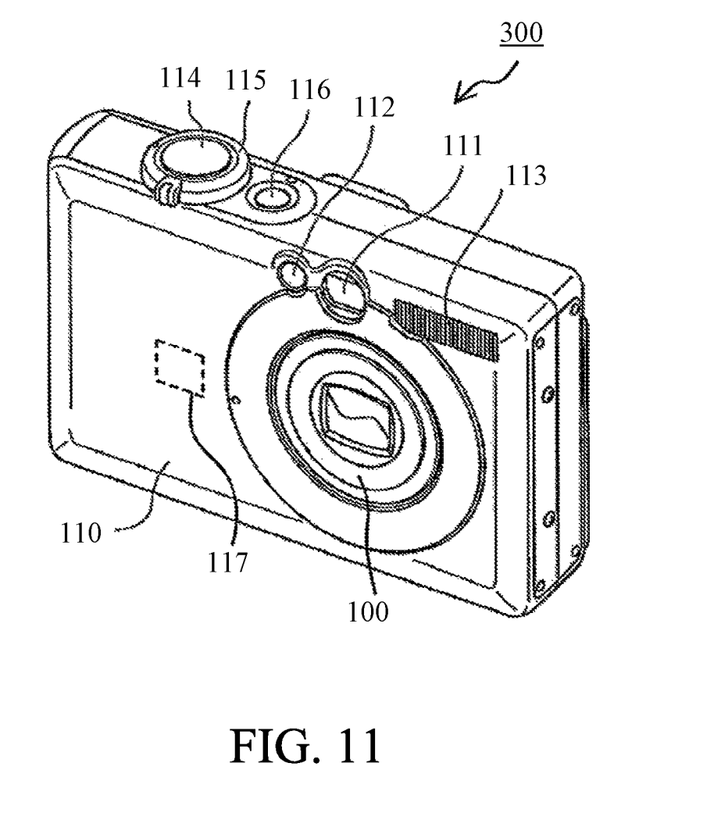
FIG. 11 is a perspective overview of an imaging apparatus according to the imaging apparatus in each embodiment.

Referring now to FIG. 11, a schematic description will be given of an imaging apparatus 300 that includes a lens barrel 100 according to each embodiment. FIG. 11 is a perspective overview of the imaging apparatus 300 (digital camera). As illustrated in FIG. 11, the imaging apparatus 300 includes an imaging apparatus body 110 and a lens barrel 100 attached to the imaging apparatus body 110. Provided on the front surface of the imaging apparatus 300 are a finder objective lens 111 for determining a composition of the object, an auxiliary light unit 112 for an auxiliary light source in the photometric action and the focus detecting action, a strobe 113, and the lens barrel 100 (lens apparatus). Provided on the top surface of the imaging apparatus body 110 are a release button 114, a zoom switch 115, and a power switching button 116.

The imaging apparatus 300 includes a CPU 117 (controller) for controlling each component. The CPU 117 serves as an adjuster configured to adjust the center position of the lens holder 20 based on the position of the lens holder 20 when the first surface on the lens holder 20 (such as stopper surfaces 20a and 120d) contacts the second surface on the second unit cylinder 21 (such as stopper surfaces 21a and 121e). The image sensor 7 illustrated in FIG. 1 etc. is provided to any one of the imaging apparatus body 110 and the lens barrel 100 in the imaging apparatus 300. In the imaging apparatus 300 in each embodiment, the lens barrel 100 is integrated with the imaging apparatus body 110 but each embodiment is not limited to this example. Each embodiment is applicable to an imaging apparatus including the imaging apparatus body and the lens barrel (interchangeable lens) detachably attached to the imaging apparatus body. Where the lens barrel is the interchangeable lens, the adjuster may be provided to the lens barrel.

As described above, by configuring the movable side mechanical end surface to be part of the conic surface with the tilt center as a vertex as in the stopper surface 20a (120d) in this embodiment, a moment in the collision of the tilting lens holder 20 can be reduced. The stopper surface 20a provided to a position just close to but outside the second lens unit as in the first embodiment can reduce the stopper angle α relative to the optical axis OA so that the collision is as close to the optical axis OA as possible (as close to the lens having a small diameter as possible). The reduced angle α can generate the vector of the repulsion force near the centroid in the collision with the stoppers and the moment applied to the movable part reduces. The perpendicular of the stopper surface 20a may pass the centroid. Moreover, when the stopper surface 21a (121e) as the fixed side mechanical end is set to part of the square pyramid surface with the rotational center O (tilt center) as a vertex, the stopper surfaces 20a (120d) and 21a (121e) contact each other in parallel in the collision of the tilting lens holder 20. Since a contact part of the stopper surface becomes a long tangent line, a moment is less likely to work.

In each embodiment, the stopper surface 21a (121e) as the fixed side mechanical end is the square pyramid surface but may be the conic surface with the same angle β. In addition, the tilt in the paper perpendicular direction is 0° in the tilt with the maximum angle β-α but may actually shift from 0° due to errors, such as the manufacturing error and scattering of the repetitive operation. Hence, when the conic surface is used for the fixed side as well as the movable side, a moving angle may slightly reduce because tilting with the maximum angle β-α shifts in the perpendicular direction and the conic surfaces collide with each other before the angle reaches the maximum angle. Hence, the square pyramid can provide a more accurate measurement.

Thus, in each embodiment, at least one of the first surface (stopper surfaces 20a and 120d) on the movable member (lens holder) and the second surface (stopper surfaces 21a and 121e) on the base member (second unit cylinder) incline to the predetermined point (rotational center O) so as to approach to the optical axis. At least one of the first surface on the movable member and the second surface on the base member may be perpendicular to the moving direction of the movable member (the moving direction along the spherical surface with the predetermined point as the center). The first surface on the movable member may be part of the conic surface with the predetermined point as the vertex (conic surface with an angle α relative to the optical axis). The second surface on the base member may be part of the square pyramid surface or the conic surface with the predetermined point as the vertex (the square pyramid surface or conic surface with the angle β relative to the optical axis).

Each embodiment provides an image stabilization apparatus, a lens barrel, and an imaging apparatus, which can stably and accurately adjust the center position of the tilt correction lens. As a result, the optical performance of the lens barrel can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-173246, filed on Sep. 6, 2016, which is hereby incorporated by reference herein in its entirety.

What is claimed is:

1. An image stabilization apparatus comprising:
a correction lens;
a lens holder configured to hold the correction lens and to move on a spherical surface with a predetermined point as a center on an optical axis for an image stabilization; and
a base member configured to movably hold the lens holder and to include a second surface that contacts a first surface on the lens holder when the lens holder moves on the spherical surface,
wherein at least one of the first surface on the lens holder and the second surface on the base member inclines to the predetermined point so as to approach to the optical axis.

2. The image stabilization apparatus according to claim 1, wherein the at least one of the first surface on the lens holder and the second surface on the base member is perpendicular to a moving direction of the lens holder.

3. The image stabilization apparatus according to claim 1, wherein the first surface of the lens holder is part of a conic surface with the predetermined point as a vertex.

4. The image stabilization apparatus according to claim 1, wherein the second surface on the base member is part of a square pyramid surface with the predetermined point as a vertex.

5. The image stabilization apparatus according to claim 1, wherein the second surface on the base member is part of a conic surface with the predetermined point as a vertex.

6. The image stabilization apparatus according to claim 1, wherein the first surface on the lens holder serves as a stopper configured to stop the movable member.

7. The image stabilization apparatus according to claim 1, wherein the first surface on the lens holder is located on a position corresponding to a lens part having a smallest diameter in the correction lens.

8. The image stabilization apparatus according to claim 1, wherein the first surface on the lens holder is located on a position closer to the optical axis than an actuator configured to move the lens holder.

9. The image stabilization apparatus according to claim 1, wherein a normal line to the first surface on the lens holder passes a centroid in a whole member that includes the correction lens and the lens holder.

10. The image stabilization apparatus according to claim 1, further comprising an adjuster configured to adjust a center position of the lens holder based on a position of the lens holder when the first surface on the lens holder contacts the second surface on the base member.

11. A lens barrel comprising:
a lens movable along an optical axis; and
an image stabilization apparatus,
wherein the image stabilization apparatus includes:
(a) a correction lens;
(b) a lens holder configured to hold the correction lens and to move on a spherical surface with a predetermined point as a center on an optical axis for an image stabilization; and
(c) a base member configured to movably hold the lens holder and to include a second surface that contacts a first surface on the lens holder when the lens holder moves on the spherical surface,
wherein at least one of the first surface on the lens holder and the second surface on the base member inclines to the predetermined point so as to approach to the optical axis.

12. An imaging apparatus comprising:
a lens barrel; and
an image sensor configured to photoelectrically convert an optical image formed by the lens barrel,
wherein the lens barrel includes:
(1) a lens movable along an optical axis; and
(2) an image stabilization apparatus,
wherein the image stabilization apparatus includes:
(a) a correction lens;
(b) a lens holder configured to hold the correction lens and to move on a spherical surface with a predetermined point as a center on an optical axis for an image stabilization; and
(c) a base member configured to movably hold the lens holder and to include a second surface that contacts a first surface on the lens holder when the lens holder moves on the spherical surface,
wherein at least one of the first surface on the lens holder and the second surface on the base member inclines to the predetermined point so as to approach to the optical axis.

* * * * *